United States Patent [19]

Hamasaki et al.

[11] 3,967,090

[45] June 29, 1976

[54] PROCESS FOR CONSUMABLE-ELECTRODE TYPE ARC CUTTING AND APPARATUS THEREFOR

[75] Inventors: Masanobu Hamasaki, Takamatsu; Fumikazu Tateiwa, Kagawa, both of Japan

[73] Assignee: Agency of Industrial Science & Technology, Tokyo, Japan

[22] Filed: Nov. 12, 1974

[21] Appl. No.: 523,069

[30] Foreign Application Priority Data

Nov. 14, 1973 Japan .............................. 48-128520

[52] U.S. Cl. .............................. 219/70; 219/75

[51] Int. Cl.² .............................. B23K 9/00

[58] Field of Search .............................. 219/70, 69 M, 69 R, 219/75

[56] References Cited

UNITED STATES PATENTS

| | | | |
|---|---|---|---|
| 2,884,510 | 4/1959 | Oyler et al. | 219/69 M |
| 2,900,485 | 8/1959 | Clark | 219/75 |
| 2,906,858 | 9/1959 | Morton | 219/75 |
| 3,082,314 | 3/1963 | Arata et al. | 219/75 |
| 3,100,255 | 8/1963 | Miller | 219/70 |
| 3,567,898 | 3/1971 | Fein | 219/75 X |

*Primary Examiner*—J. V. Truhe
*Assistant Examiner*—David A. Tone
*Attorney, Agent, or Firm*—Oblon, Fisher, Spivak, McClelland & Maier

[57] ABSTRACT

In the consumable-electrode type arc cutting process whereby the work subjected to cutting is fused and severed by means of a continuous electric arc formed between the wire electrode protruding from the contact tip and the work, an improvement is obtained by the additional utilization of a jet of high-pressure water projected out of a water projection nozzle disposed on the outside of the contact tip. The jet of high-pressure water projected from said nozzle is directed to the point of arc formation on the work so as to blow the molten metal of the work away, whereby the severed edges of the work are prevented from being joined again and, at the same time, the dross is prevented from being deposited on the work and consequently the cut edge of the work is finished neatly.

6 Claims, 9 Drawing Figures

1

8

2

Power unit

3

9

5

1
7
3
Power unit
4
2
6
5

2
5
PRIOR ART 1
4'
8
3

Power unit
4
2
9
V
V
5

(A)

(B)

PROCESS FOR CONSUMABLE-ELECTRODE TYPE ARC CUTTING AND APPARATUS THEREFOR

BACKGROUND OF THE INVENTION

This invention relates to a process for the consumable-electrode type arc cutting and to an apparatus to be used therefor.

The consumable-electrode type arc cutting process of the conventional principle uses the power unit of a DC arc welder as its power source, with one output terminal of the power unit connected to the wire electrode via the contact tip of the cutting torch and the other terminal connected to the work subjected to cutting, establishes a path of electric current through the wire electrode and the work to give rise to an arc therebetween to fuse and sever the work and simultaneosly causes a shielding gas projected from the annular orifice surrounding the wire electrode to be blown against the work so as to shield the point of arc formation on the work against the ambient air and permits this operation of fusing and severing of the work to be carried out continuously by having the wire electrode paid out by means of the feed roller as the wire electrode is consumed by the arc. According to this process, however, the molten metal of the work hangs down from the bottom surface along the severed edges of the work to form what is called "dross." As the arc cutting of the work proceeds, the dross occurring immediately behind the port of arc formation on the work sometimes develops to the extent of joining the freshly severed edges of work and, on hardening, filling up the formed cut. In the case of a work having a relatively large thickness, this process has been found to experience difficulty in effecting the desired severance. Even in the case of a work having a small thickness, this process may cause the dross to adhere to the severed edges of the work and consequently prevent the cut portion of the work from being neatly finished.

An object of this invention is to provide a process for consumable-electrode type arc cutting which prevents the dross from being deposited on the severed edges of the work and permits the cut portion of the work to be finished neatly.

Another object of this invention is to provide a process for consumable-electrode type arc cutting which permits the severance of workpieces having thicknesses over a relatively wide range to be effected easily without allowing the severed edges to be joined again.

Still another object of this invention is to provide a process for consumable-electrode type arc cutting which permits the severance of the work to be accomplished as easily under water as in the atmosphere.

Yet another object of this invention is to provide a process for consumable-electrode type arc cutting which uses a constant voltage type power source or rising voltage type power source and therefore permits the severance of the work to be effected with the utmost safety from electric shock.

SUMMARY OF THE INVENTION:

To attain the objects described above according to this invention, there is provided an improvement in the consumable-electrode type arc cutting process whereby a work subjected to cutting is fused and severed by means of a continuous electric arc to be formed between the wire electrode protruding from the contact tip and the work, said improvement residing in the additional utilization of a jet of high-pressure water which is projected out of a water projection nozzle disposed on the outside of the contact tip and directed to the point of arc formation on the work. Since the jet of high-pressure water is directed to the point of arc formation on the work to blow the molten metal of the work away and keep the severed edges of the work clean of the molten mttal of the work, this invention permits the cut edge to be neatly finished without any possibility of the dross filling up the formed cut again. Thus, the arc cutting can easily be accomplished practically regardless of the thickness or kind of the work subjected to arc cutting. Further, even when a solid wire or flux-cored wire is used as the electrode, the necessity for using a shielding gas is obviated because the jet of water is constantly projected to the portion at which the electrode produces the arc. The arc cutting, therefore, can be accomplished as easily under water as in the atmosphere according to this invention. Further, the arc voltage used can be as low as of 25 – 30V. If a power source of constant voltage is used, then there can be obtained a substantially equal level of secondary voltage. A still lower level of secondary voltage can be obtained by using a rising voltage type power source. At such a low voltage, accidents involving electric shock occur very rarely. Although electric shocks are more likely to occur under water, under water arc cutting carried out according to this invention can be accomplished quite safely because of the use of such low voltage.

The other objects and other characteristics of the present invention will become apparent from a more specific description to be given herein below with reference to the accompanying drawings.

DETAILED DESCRIPTION OF THE INVENTION

Figure 1:
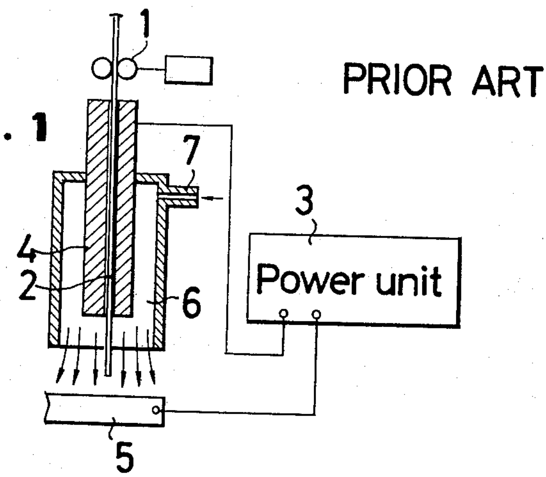
FIG. 1 is a cross-sectional view of an apparatus for practicing the consumable-electrode type arc cutting process of the conventional principle.

FIG. 1 shows the consumable-electrode type arc cutting apparatus of the conventional principle. One terminal of the power unit 3 of an arc welder is connected to the contact tip 4 of the cutting torch and the other terminal of the power unit is connected to the work 5 subjected to cutting. The wire electrode 2 passes through the interior of the contact tip, so that the electric current flows through the contact tip to the wire electrode 2. At the upper portion of the wire electrode 2 is disposed a pair of feed rollers 1, which rotate to push down the wire electrode at the rate at which the electrode is consumed, with the result that the wire electrode protrudes from the contact tip to a fixed length to keep the length of the arc at a prescribed value. The forward end of the contact tip is surrounded by a nozzle 6. Through an inlet 7 disposed at the upper section of the nozzle 6, argon gas, carbon dioxide gas or a mixed gas consisting of argon or carbon dioxide gas and oxygen is introduced and projected through the nozzle 6 as a shielding gas intended to shield the cut portion of work against the ambient air.

Figure 2:
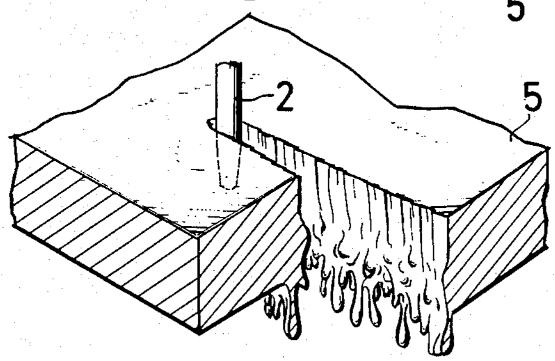
FIG. 2 is an explanatory diagram illustrating the arc electrode and the work in its severed state while the arc cutting is carried out by the apparatus of FIG. 1.

In the apparatus described above, when electric current is allowed to flow from the power unit 3 through the wire electrode 2 and the work 5 and the shielding gas is projected through the nozzle 6, an arc is stably formed between the wire electrode and the work. In this manner, the arc cutting of the work can be continued. According to this process, however, the molten metal of the work resolidifies between the severed edges immediately behind the point of arc formation or the molten metal hangs down from the bottom surface of the work along the severed edges as illustrated in FIG. 2. This process, therefore, fails to provide perfect severance or, if the severance is obtained somehow or other, the cut edge of the work assumes an ugly appearance.

Figure 3:
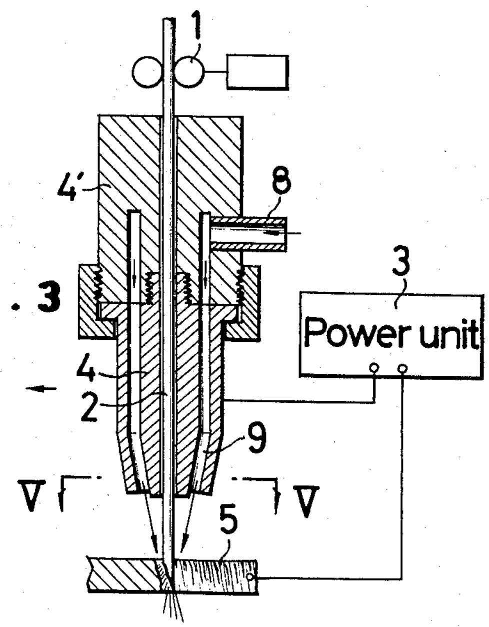
FIG. 3 is a longitudinal cross section of one preferred embodiment of the apparatus used for practicing the consumable-electrode type arc cutting process according to the present invention.

The process according to the present invention eliminates d the shortcomings described above. Referring to FIG. 3, one terminal of the power unit 3 for an arc welder is connected to the contact tip 4 of the cutting torch and the other terminal of the power unit is connected to the work 5 subjected to cutting. The wire electrode 2 passes through the interior of the contact tip and the feed rollers 1 are disposed above the contact tip. The feed rollers 1 serve the purpose of causing the wire electrode to be paid out continuously from the forward end of the contact tip. Around the periphery of the contact tip is formed a nozzle 9 for projection of water. The upper end of the nozzle 9 is connected to a water inlet 8. High-pressure water is introduced through the water inlet 8 and projected in the form of a jet through the nozzle 9. In the present embodiment, the contact tip 4 is supported in position by a torch body 4' so that, when the forward end of the contact tip is damaged as by the arc, for example, the damaged contact tip can easily be replaced with a new contact tip. As the wire electrode 2 to be used for the purpose of this invention, a flux-colored wire is used most advantageously where the work subjected to cutting is of stainless steel, mild steel, aluminum, copper, or copper alloy. A solid wire may be used as the wire electrode where the work is of aluminum, copper or copper alloy.

Figure 4:
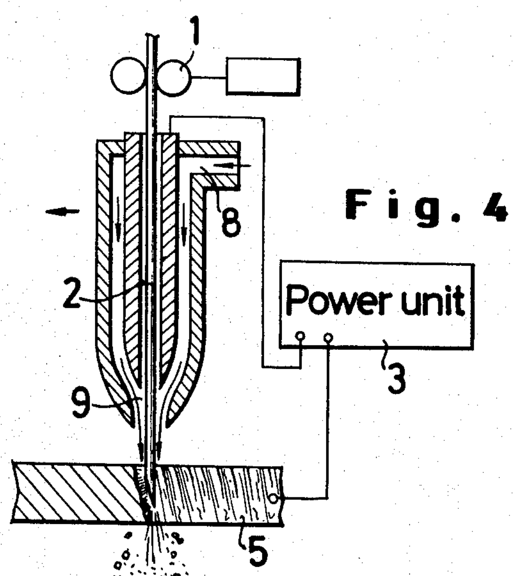
FIG. 4 is a longitudinal cross section of another preferred embodiment of the apparatus for practicing the consumable-electrode type arc cutting process according to the present invention.

When the electric current is allowed to flow from the power unit 3 for an arc welder to the wire electrode 2 and the work 5 and, at the same time, the high-pressure is supplied through the nozzle, the arc is formed between the wire electrode 2 and the work to meld the work and the high-pressure water is projected in the form of a jet through the nozzle 9. The nozzle 9 is slightly inclined toward the center near the nozzle tip, so that the jet of high-pressure water projected from the nozzle is concentrated at the point at which the arc is melting the work. Thus, the jet of high-pressure water blows the molten metal of the work away as it is formed by the arc, with the result that the molten metal is prevented from adhering to the severed edges of work or at the bottom surface along the cut edge. Since the molten metal of the work is blown away as just described, it is prevented from adhering to the bottom surface in the form of dross along the cut edge or from joining the freshly severed edges of the work. So the jet of high-pressure water permits production of a neatly finished cut edge of the work. In addition, the possibility of the molten metal of the work scattered at the time of arc formation adhering to the contact tip can be prevented by the jet of high-pressure water from the nozzle 9. Necessity for a shielding gas is obviated by this invention, because the point at which the electrode produces the arc is constantly shielded by the jet of water. The shape of the cutting torch is not necessarily limited to the structure shown in FIG. 3. As illustrated in FIG. 4, for example, the forward end of the nozzle 9 may be formed so as to surround the wire electrode 2 directly and permit the jet of high-pressure to be projected along the wire electrode.

For example, when a cutting torch in which a cylindrical nozzle 12mm in outside diameter is disposed around the contact tip and a flux-core wire is passed through the inner hole of the contact tip is used to cut a plate of mild steel 16mm in thickness at the rate of 30 cm/min by use of an electric current of 600 A, the work is melted only partially and cannot be completely severed if high-pressure water is not projected through the nozzle. When the projection of water of a pressure of 1 $kg/cm^2$ through the nozzle is started, then cutting of the plate begins to ensue. Although the plate is severed under the conditions described above, dross still clings to the severed edges of the work and consequently prevents the cut edge from being finished neatly. When the pressure of water is increased to 2 $kg/cm^2$, dross decreases and the cut edge of the work is finished with increased neatness. When the pressure of water is further heightened to 5 $kg/cm^2$, dross completely ceases to occur. (The water consumption is about 6 liters per minute in the case of a water pressure of 5 $kg/cm^2$.) When the water pressure is increased to 10 $kg/cm^2$, the cut edge of work is finished with substantially the same degree of neatness as when the water pressure is 5 $kg/cm^2$. Generally, the forward end of the contact tip is kept at a distance of about 15mm from the surface of the work. Variation of this distance to the extent of 3 to 40mm has substantially no effect upon the cutting.

A plate of mild steel 30mm in thickness can be cut by operating the aforementioned cutting torch with an electric current of 800 A. When the arc cutting is carried out on a mild steel plate of such great thickness, the arc advances into the thickness of the plate downwardly. As the arc reaches the rear face of the plate, it is brought up to the top face and then advanced downwardly through the plate thickness. By repeating this procedure, the arc cutting of the plate is carried out. So far as the jet of high-pressure water is projected at the point of arc formation, the high-pressure water serves the purpose of blowing the molten metal of the work away and at the same time heightening the rate of arc movement relative to the plate thickness to the order of from 10000 mm/sec to 2000 mm/sec. For the same amount of electric current consumed, the process of the present invention enables the same amount of cutting to be accomplished at a higher rate of speed and permits the cutting of a plate of a greater thickness to be accomplished more readily than by the conventional consumable-electrode type arc cutting process. Possible reason for the successful cutting which is accomplished by the process of this invention on plates of increased thickness is that the jet of high-pressure water blows away the molten metal of the work as soon as it forms at the point of arc formation and consequently facilitates the movement of the arc.

Figure 5:
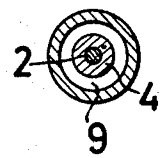
FIG. 5 is a cross-sectional view taken along the line V—V in FIG. 3.
Figure 6:
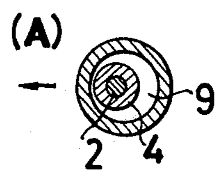
FIGS. 6(A) and (B) are cross section illustrating preferred embodiments of the nozzle of the cutting torch according to the present invention.
Figure 7:
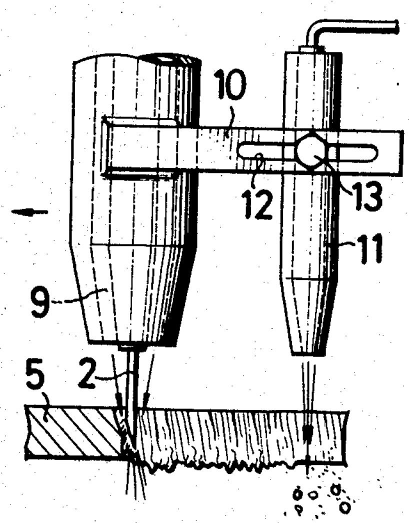
FIG. 7 is a side view illustrating another embodiment of the cutting torch according to this invention.
Figure 8:
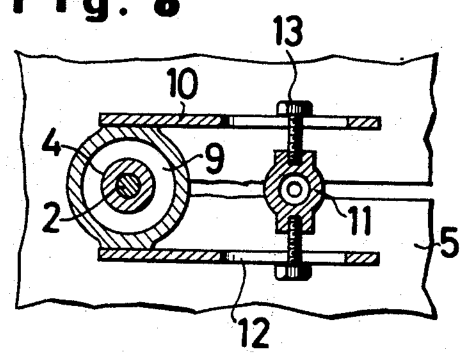
FIG. 8 is a plan view in cross section of the cutting torch of FIG. 7.

When the cutting torch is operated manually, it frequently happens that the torch must be moved in various directions. For use in the manual operation, therefore, the cutting torch is desired to be constructed in a concentric structure wherein the nozzle 9 is disposed, as shown in FIG. 5, with a uniform aperture width around the entire periphery of the contact tip. When the wire electrode 2 and the nozzle 9 are concentrically arranged as described above, the jet of water projected through the nozzle is always directed to the point of arc formation, irrespectively of the direction in which the cutting torch is moved. Thus, the jet of high-pressure water blows the molten metal of the work away to ensure production of a neatly finished cut edge of the work. When the cutting torch is mounted on automatic travelling means so as to serve as an automatic cutter, the directions in which the cutting torch is moved are fixed. In this case, therefore, it is decisively advantageous that the center of the nozzle be deviated from the center of the contact tip, as shown in FIG. 6(A), in the direction of the arrow mark in which the torch is moved so that little water is projected to the point of work yet to be severed and most of the projected water is directed to the point at which the arc is currently melting the work. In the case of a work having a large thickness, the jet of high-pressure water, when projected to the very point of arc formation, serves not merely to blow the molten metal of the work away but also to heighten the rate of arc movement. When the nozzle is shaped in an elliptic or oval form as shown in FIG. 6(B) and disposed eccentrically with respect to the contact tip 4, the jet of high-pressure water can effectively be projected to not only the point of arc formation but the portion of work which has just been severed and is still in a molten state. The shape and width of the slit in the nozzle, the relative position of the contact tip, etc. are suitably selected in due consideration of the kind and thickness of the work subjected to arc cutting, the condition of arc formation, and so on.

When the arc cutting is carried out on a given work at an increased rate of speed, the length of the cut in which the severed edge of work still remain in a molten state behind the point of arc formation is proportionally increased. This high-speed arc cutting of the work can be accomplished in a neat finish, therefore, by allowing a nozzle 9 adapted to project a small amount of water around the periphery of the contact 4, causing a suitable supporting arm 10 to extend from the cutting torch proper in the direction opposite that of the arc movement separately of the nozzle 9 and fastening an additional nozzle 11 for water projection to said supporting arm 10 so that the jets of high-pressure water are projected, one to the point of arc formation on the work and the other to the point already severed and still in a molten state. If, in this case, the hole 12 for fastening the supporting arm is shaped in an oblong form and a screw 13 is passed through this oblong hole 12 to provide support for the nozzle, then the hole can be utilized for adjusting the distance between the cutting torch and the nozzle 11 or for adjusting the projecting angle of nozzle. If the shape of the nozzle is flattened in the direction of the arc movement, then the jet of high-pressure water can blow away the molten metal of the work more effectively. Naturally it is permissible for the nozzle 11 to be fastened to some other member of the system so far as the member travels simultaneously with the cutting torch.

When the jet of high-pressure water is projected to the point of arc formation as described above, the stability of the arc is impaired to some extent. The loss of arc stability is such that, in the case of welding, there is entailed a disadvantage that blow holes occur along the welded portion or weld beads become uneven. In the case of arc cutting, however, since the heat of the arc is utilized only for fusing the work, such slight loss of arc stability has no adverse effect on the cutting.

When there is used a non-consumable electrode of tungsten, the shielding gas must be supplied at least to the point of the tungsten for preventing the tungsten from oxidation notwithstanding the use of the water jet. Where there is used a consumable electrode as in the case of the present invention, oxidation of the electrode does not pose any problem. Moreover, a slight loss of arc stability does not matter as described above. In the arc cutting according to this invention, therefore, the jet of high-pressure water can be projected to the vicinity of arc without requiring supply of shielding gas.

The arc cutting by the process of this invention can be applied not merely to works made of mild steel but also to works made of all electroconductive metals such as, for example, aluminum alloys, stainless steel, copper alloys, etc.

Since the nozzle projects the jet of water from the entire periphery thereof, it is always maintained in a cooled state. Therefore, a large magnitude of electric current can be passed by using a relatively small nozzle. As a result, the arc cutting can easily be accomplished on plates of mild steel up to 30mm in thickness and on plates of aluminum up to 45mm in thickness by using an electric current of 800 A. On an aluminum plate 12mm in thickness, the arc cutting can be effected at the high rate of speed of 2 m/min by using an electric current of 700 A. In the case of a mild steel plate 10mm in thickness, the arc cutting by use of an electric current of 900 A proceeds at a high rate of speed of 2 m/min.

As a matter of course, the process of this invention can be effected in the atmosphere. It can also be carried out as effectively under water as in the atmosphere. Since in the present invention, the jet of high-pressure water is projected to the point of arc formation, the portion of the work which the arc is melting is substantially kept in water even when the cutting is carried out in the atmosphere. Thus, entirely the same effect of arc cutting is obtained when the operation is performed under water as when it is carried out in the atmosphere. When the operation is in the atmosphere, there ensues a disadvantage that the field of operation becomes wet. This trouble, of course, loses its significance when the operation is performed under water. Compared with other underwater cutting processes, the process of the present invention enjoys many advantages such as simplicity of operation, obviated necessity for welding rod replacement and consequent improvement in cutting efficiency, and freedom from electric shocks owing to use of low voltage.

As in clear from the foregoing detailed description of the invention, the jet of high-pressure water projected to the vicinity of arc formation serves to blow the molten metal of work away to give a neat finish to the cut edge and preclude the possibility of the severed edges being joined again. It is especially noteworthy that the arc cutting by the process of this invention can be carried out as effectively under water as in the atmosphere. Compared with the conventional underwater arc cutting processes, the present process is easy to carry out and provides a neat finish to the cut edge.

What is claimed is:

1. A consumable-electrode type arc cutting process using a wire as the electrode, which comprises:

passing an electric current through the work subjected to cutting and the wire electrode protruding from a contact tip serving as the path for electric current for thereby producing a continuous electric arc between the wire electrode and the work, allowing the work to be fused and severed by the arc and, at the same time, projecting a jet of water, pressurized to a value substantially in excess of atmospheric pressure, from a water projecting nozzle disposed around the periphery of the contact tip to the freshly fused point of work, and continuing the arc cutting while causing the molten metal of the work to be blown away from the severed edges by the jet of water.

2. A consumable-electrode type arc cutting apparatus, comprising:

a contact tip having a wire electrode passing through the interior thereof, means adapted to supply the wire electrode disposed above said contact tip, a nozzle adapted to project a jet of water, pressurized to a value substantially in excess of atmospheric pressure, and disposed so that the aperture thereof surrounds the wire electrode where the electrode protrudes from said contact tip.

means for supplying said pressurized water to said nozzle, and means for supplying an electric current to said contact tip and the work, whereby the arc to be formed between the wire electrode and the work fuses and severs the work and the jet of pressurized water projected from the nozzle is utilized for blowing the molten metal of the work away from the severed edges.

3. The arc cutting apparatus of claim 2, wherein the nozzle at the bottom face of the contact tip is concentrically positioned relative to the wire electrode.

4. The arc cutting apparatus of claim 2, wherein the nozzle at the bottom face of the contact tip is eccentrically positioned relative to the wire electrode.

5. The arc cutting apparatus of claim 2, wherein means for projecting a jet of high-pressure water is disposed additionally at a distance from the contact tip.

6. The arc cutting apparatus of claim 5, wherein the means for projecting a jet of high-pressure water is disposed at a position such that the jet of water is projected to the point at which the work is being fused by the arc.

* * * * *

Notice of Adverse Decision in Interference

In Interference No. 96,816, involving Patent No. 3,967,090, M. Hamasaki and F. Tateiwa, PROCESS FOR CONSUMABLE-ELECTRODE TYPE ARC CUTTING AND APPARATUS THEREFOR, final judgment adverse to the patentees was rendered May 2, 1980, as to claim 1.

[*Official Gazette September 30, 1980.*]